(12) United States Patent
Kim

(10) Patent No.: US 7,504,863 B2
(45) Date of Patent: Mar. 17, 2009

(54) HALF-DUPLEX COMMUNICATION SYSTEM, LOW-VOLTAGE DIFFERENTIAL SIGNALING TRANSCEIVER OF THE SYSTEM AND PRE-DRIVER OF THE TRANSCEIVER

(75) Inventor: Jin Hyun Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 130 days.

(21) Appl. No.: 11/455,776

(22) Filed: Jun. 20, 2006

(65) Prior Publication Data

US 2007/0042722 A1 Feb. 22, 2007

(30) Foreign Application Priority Data

Jun. 21, 2005 (KR) .................... 10-2005-0053461

(51) Int. Cl.
*H03K 19/0175* (2006.01)
*H03K 19/094* (2006.01)

(52) U.S. Cl. ............................. 326/86; 326/17; 326/83

(58) Field of Classification Search ................ 326/17, 326/82, 83, 86; 455/73
See application file for complete search history.

(56) References Cited

U.S. PATENT DOCUMENTS

| 5,764,086 | A | 6/1998 | Nagamatsu et al. |
|---|---|---|---|
| 5,977,796 | A | 11/1999 | Gabara |
| 6,556,071 | B2 | 4/2003 | Notani et al. |
| 6,617,888 | B2 | 9/2003 | Volk |
| 7,078,935 | B2 * | 7/2006 | Choi ........................... 326/82 |
| 7,190,188 | B2 * | 3/2007 | Otsuka et al. ................. 326/30 |
| 2003/0062948 | A1 | 4/2003 | Notani et al. |

FOREIGN PATENT DOCUMENTS

| JP | 2003-110022 | 4/2003 |
|---|---|---|
| KR | 10-2003-0010234 | 2/2003 |

* cited by examiner

*Primary Examiner*—Daniel D Chang
(74) *Attorney, Agent, or Firm*—Harness, Dickey & Pierce, P.L.C.

(57) ABSTRACT

A half-duplex communication system may include one or more low-voltage differential signaling half-duplex transceivers. Each transceiver may include a plurality of input terminals receiving a plurality differential data signals, an input driver transferring the differential data signals from differential transmission lines through output terminals, and an output driver transferring the differential data signals from the input terminals through the differential transmission lines and out to one of the first and second transceivers via the non-inverse and inverse transmission lines. The differential data signals may be transferred in response to the differential data signals at the input terminals and at the output terminals of the input driver. Each transceiver may include a pre-driver configured to shift a reference voltage level of differential data signals input thereto from the input terminals and which are to be supplied to the output driver therefrom.

11 Claims, 5 Drawing Sheets

US 7,504,863 B2

HALF-DUPLEX COMMUNICATION SYSTEM, LOW-VOLTAGE DIFFERENTIAL SIGNALING TRANSCEIVER OF THE SYSTEM AND PRE-DRIVER OF THE TRANSCEIVER

PRIORITY STATEMENT

This U.S. non-provisional patent application claims priority under 35 U.S.C. § 119 to Korean Patent Application No. 10-2005-053461 filed Jun. 21, 2005 in the Korean Intellectual Property Office, the entire contents of which are hereby incorporated by reference herein.

BACKGROUND OF THE INVENTION

1. Field of the Invention

Example embodiments of the present invention in general are related to a half-duplex low-voltage differential signaling half-duplex transceiver of the system, and a pre-driver of the transceiver.

2. Description of the Related Art

Normally, half-duplex communication systems enable data communication between circuit module chips on printed circuit boards. A half-duplex communication system is typically composed of one or more half-duplex transceivers embedded in each of the circuit module chips. The half-duplex transceivers perform alternating operations of transmitting signals toward the opposite sites and receiving signals from the opposite sites. To perform these operations, each half-duplex transceiver includes a transmitter and a receiver.

As such, the transmitter and receiver in a half-duplex transceiver must be able to process high frequency data signals. In order to accomplish high-frequency data communication, the transmitter and receiver of the half-duplex transceiver are operable with high-frequency data signals. Although configuring a receiver to handle high-frequency data signals is rather straight forward, it is difficult even now to configure a transmitter for transferring data signals at high frequency because of limitations related to the power application needed for transmitting the data signals.

Conventional half-duplex transmitters employed in half-duplex communication systems for high-frequency data communication include current-mode transceivers, low-voltage differential signaling transceivers and duplex low-voltage differential signaling transceivers. However, these conventional transceivers are generally not robust for conducting high-frequency data communication. This is explained with reference to FIGS. 1 through 3, which illustrate half-duplex communication systems, each figure respectively illustrating a current-mode transceiver, a low-voltage differential signaling transceiver and a duplex low-voltage differential signaling transceiver.

FIG. 1 is a circuit diagram of a conventional half-duplex communication system employing a current-mode transceiver. In FIG. 1, output drivers 10 and 12 in a half-duplex communication system configured for a current mode to differentially amplify non-inverse and inverse data signals on non-inverse and inverse input lines (FDP and FDN, or SDP and SDN), to be transferred through non-inverse and inverse transceiver line TLN toward a corresponding input driver 20 and 22 on another circuit module chip.

In operation, an output driver 10 or 12 controls the amount of current flowing into a current sink CRS11 through a sink node SN11. This is done using a first NMOS transistor MN11 in the non-inverse transmission line TLP responding to the non-inverse input line FDP (or SDP), and by way of controlling the current flowing into the current sink CRS11 through the sink node SN11 using a second NMOS transistor MN12 in the inverse transmission line TLN responding to the inverse input line FDN (or SDN). Thus, non-inverse and inverse data signals transferred respectively through the non-inverse and inverse transmission lines TLP and TLN have waveforms which are configured such as to asymmetrically oscillate on the center level between a high potential VDD and a low potential VSS.

In addition, the half-duplex communication system of FIG. 1 prevents reflection of signals by connecting terminal resistors RL11 through RL14, having a resistance of 50Ω. These resistors are provided at both ends of the non-inverse and inverse transmission lines TLP and TLN. By connecting the terminal resistors RL11 through RL14 to the non-inverse and inverse transmission lines TLP and TLN in parallel, the non-inverse and inverse data signals transferred through the corresponding non-inverse and inverse transmission lines TLP and TLN oscillate at a 20 mV amplitude, as currents of about 8 mA flow through the non-inverse and inverse transmission lines TLP and TLN. As a result, the current-mode half-duplex communication system is a heavy consumer of current.

In an effort to address the problems in the current-mode half-duplex communication system of FIG. 1, another conventional half-duplex communication system has been proposed for processing low-voltage differential signals, as shown in FIG. 2. In a conventional half-duplex communication system for low-voltage differential signals, an output driver 30 (or 32) includes first PMOS transistor MP31 and second PMOS transistor MP32. PMOS transistors MP31 and MP32 regulate the amount of current flowing to the non-inverse transmission line TLP and the inverse transmission line TLN coming from a first sink node SN31 connected to a first current sink CRS31. The first and second NMOS transistors MN31 and MN32 also regulate the amount of current flowing from the non-inverse and inverse transmission lines TLP and TLN to a second sink node SN32 that is connected to a second current sink CRS32.

Accordingly, non-inverse and inverse data signals on corresponding non-inverse and inverse input lines FDP and FDN (or SDP and SDN) are amplified in differential modes. Therefore, in the conventional low-voltage differential signaling half-duplex communication system of FIG. 2, the non-inverse and inverse data signals that symmetrically oscillate on the center level between the high and low potentials are transferred through the non-inverse and inverse transmission lines TLP, TLN.

Further in the conventional low-voltage differential signaling half-duplex communication system of FIG. 2, a single terminal resistor RL21 (or RL22) is connected between the non-inverse and inverse transmission lines TLP and TLN that connect the output driver 30 (or 32) with an input driver 20 (or 22). Thus, in the conventional low-voltage differential signaling half-duplex communication system of FIG. 2, as the PMOS transistor MP31 and MP32 and the NMOS transistors MN31 and MN32 are turned on or off, it is difficult for a pre-driver (not shown, which supplies differential data signals to the output driver 30 or 32) to operate at a high frequency. Due to this difficulty, conventional low-voltage differential signaling half-duplex communication system is regarded as inadequate in an environment where data signals are transferred among circuit module chips at high frequencies.

In an effort to overcome the limitations in transferring high frequency data signals in conventional low-voltage differential signaling half-duplex communication systems, a conventional half-duplex communication system for low-voltage differential signals has been proposed, as shown in FIG. 3.

Referring to FIG. 3, an output driver 50 (or 52) which is configured different than the output driver 30 (or 32 of FIG. 2), includes PMOS transistors MP51 and MP52 and NMOS transistors MN51 and MN52 in order to respond to respective duplex differential data signals, i.e., non-inverse and inverse P-channel data signals, and non-inverse and inverse N-channel data signals. To preliminarily amplify these duplex differential data signals, a pre-driver 40 (or 42) is used. The pre-driver 40 or 42 includes a P-channel amplifier (composed of three PMOS transistors MP31~MP33), and an N-channel amplifier (composed of three NMOS transistors MN31~MN33). With the pre-driver 40 or 42 in this configuration, it is possible for the low-voltage differential signaling half-duplex communication system to transfer high-frequency data signals.

However, in the conventional low-voltage differential signaling half-duplex communication system of FIG. 3, since the pre-driver 40 (or 42) activates the P-channel and N-channel differential data signals using independent circuits without synchronization, a skew occurs between the duplex differential data signals. As a result, the conventional system of FIG. 3 operates inefficiently in the application of high-frequency communication between circuit module chips on a printed circuit board. Additionally, the use of these independent circuits complicates the pre-driver 40 (or 42) configuration (i.e., requires twice as many components). Moreover, the system of FIG. 3 requires a complex duplex differential data signal source (i.e., a parallel-to-serial data converter that is called a "data multiplexer" in a semiconductor memory chip) for supplying the duplex differential data signals to the pre-driver 40 (or 42).

SUMMARY OF THE INVENTION

An example embodiment of the present invention is directed to a low-voltage differential signaling transceiver. The transceiver may include a plurality of input terminals receiving a plurality of differential data signals and an input driver transferring the differential data signals from differential transmission lines through output terminals and the transmitter may include an output driver transferring the differential data signals from the input terminals through the differential transmission lines in response to the differential data signals at the input terminals and at the output terminals of the input driver.

Another example embodiment of the present invention is directed to a pre-driver for a low-voltage differential signaling transceiver having a plurality of input terminals receiving differential data signals and an output driver. The pre-driver includes a first transistor connected between a first input terminal and the output driver. The first transistor regulates an amount of current flowing from a first output node connected thereto to a sink node connected thereto based on a potential of a differential data signal on a first input line connected to the first transistor from the first input terminal. The pre-driver includes a second transistor connected between a second input terminal and the output driver. The second transistor regulates an amount of current flowing from a second output node connected thereto to the sink node based on a potential of a differential data signal on a second input line connected to the second transistor from the second input terminal.

Another example embodiment of the present invention is directed to a half-duplex communication system. The system may include a first transceiver and a second transceiver. The second transceiver is connected to the first transceiver via a non-inverse transmission line and an inverse transmission line. Each transceiver may include a plurality of input terminals receiving a plurality of differential data signals, an input driver transferring the differential data signals from differential transmission lines through output terminals, and an output driver transferring the differential data signals from the input terminals through the differential transmission lines and out to one of the first and second transceivers via the non-inverse and inverse transmission lines. The differential data signals may be transferred in response to the differential data signals at the input terminals and at the output terminals of the input driver. Each transceiver may include a pre-driver configured to shift a reference voltage level of differential data signals input thereto from the input terminals and to be supplied to the output driver therefrom.

BRIEF DESCRIPTION OF THE DRAWINGS

The accompanying drawings are included to provide a further understanding of example embodiments of the present invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS

Example embodiments of the present invention will be described below in more detail with reference to the accompanying drawings. The present invention may, however, be embodied in different forms and should not be construed as limited to example embodiments set forth herein. Rather, these example embodiments are provided so that this disclosure will be thorough and complete, and will fully convey the scope of the invention to those skilled in the art. Like numerals refer to like elements throughout the specification.

Accordingly, as to be described in more detail hereafter, an example embodiment of the present invention is directed to a low-voltage differential signaling (LVDS) half duplex transmitter and a LVDS half duplex transceiver, each having a relatively simple circuit configuration. The LVDS transmitter and/or transceiver may offer high-frequency communication for data signals between circuit module chips on a printed circuit board.

Figure 4:
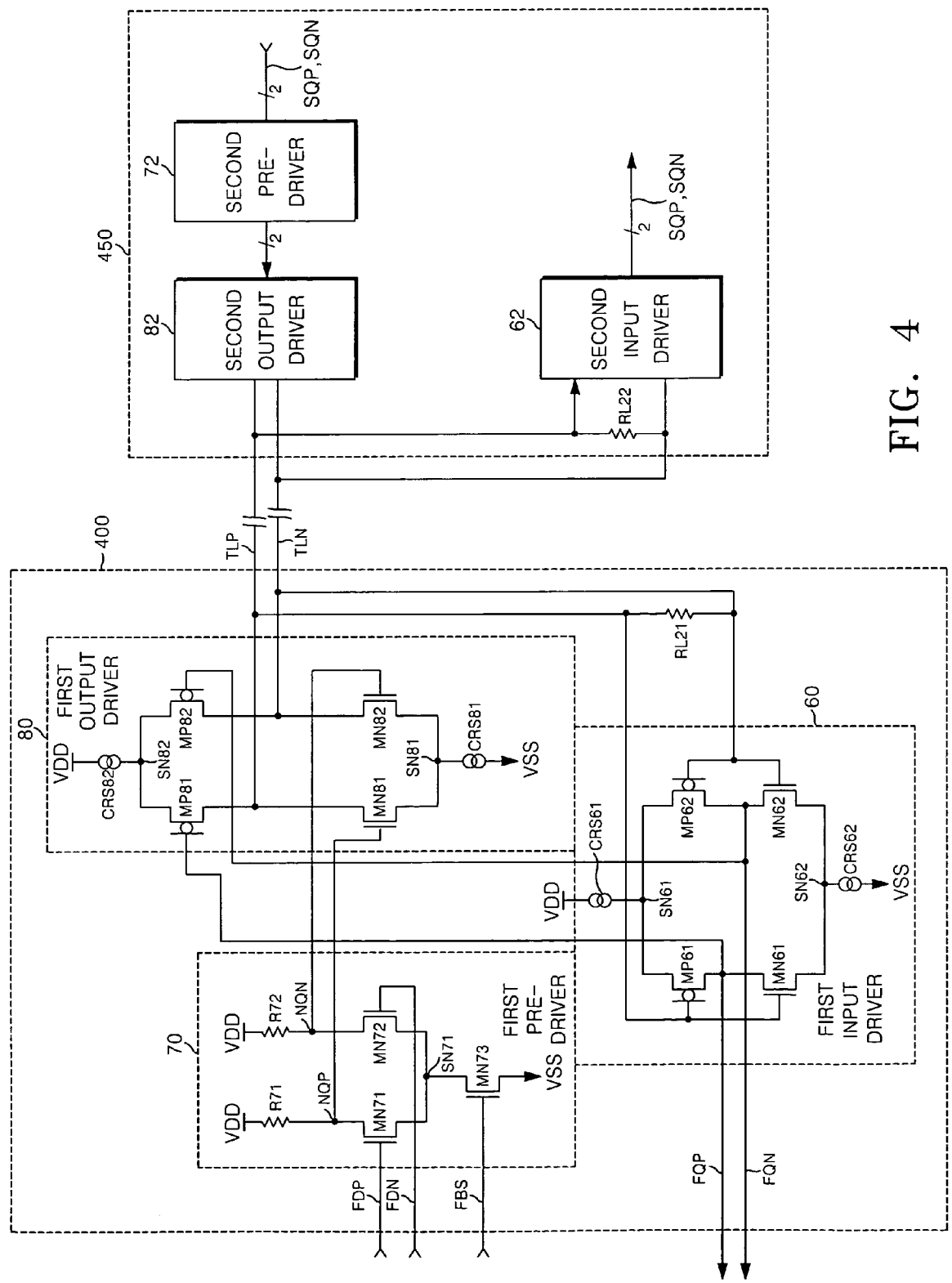
FIG. 4 is a circuit diagram illustrating a half-duplex communication system having an LVDS transmitter in accordance with an example embodiment of the invention.

FIG. 4 is a circuit diagram illustrating a half-duplex communication system having an LVDS transmitter in accordance with an example embodiment of the present invention. Referring to FIG. 4, a half-duplex communication system with a LVDS transceiver according to an example embodiment of the present invention includes a first pre-driver 70 and a first output driver 80 serially connected between the first non-inverse line FDP and the inverse input line FDN, and the non-inverse transmission line TLP and inverse transmission line TLN. A first input driver 60 is connected between the non-inverse and inverse transmission lines TLP and TLN and the first non-inverse and inverse output lines FQP, FQN. The first pre-driver 70, first output driver 80 and first input driver 60 may constitute a first LVDS half-duplex transceiver 400 embedded in a circuit module chip on a printed circuit board (not shown). The LVDS half-duplex transceiver prosecutes high-frequency data communication with another LVDS half-duplex transceiver 450 in another circuit module chip (not shown) via the non-inverse and inverse transmission lines TLP and TLN, as shown in FIG. 4. This may be done in a pattern of alternate transmitting and receiving operations.

In addition, the half-duplex communication system of FIG. 4 includes a second pre-driver 72 and a second output driver 82 serially connected between second non-inverse and inverse input lines SDP and SDN, and the non-inverse and inverse transmission lines TLP and TLN. A second input driver 62 is connected between the non-inverse and inverse transmission lines TLP and TLN, and the second non-inverse and inverse output lines SQP and SQN.

The second pre-driver 72, second output driver 82 and second input driver 62 constitute the second LVDS half-duplex transceiver 450 embedded in another circuit module chip on a printed circuit board (not shown). The second LVDS half-duplex transceiver 450 operates the same as the first half-duplex transceiver 400. Furthermore, the second pre-driver 72, second output driver 82 and second input driver 62 have the same structure and/or function as the corresponding first pre-driver 70, first output driver 80 and first input driver 60.

Accordingly, system operation will be described with reference to the first pre-driver 70, first output driver 80 and first input driver 60, it being understood that the second LVDS transceiver 450 operates in the same manner as first LVDS transceiver 400.

As shown in FIG. 4, the first pre-driver 70 amplifies a gap signal between differential data signals on the non-inverse input line FDP and the inverse input line FDN, and supplies the amplified gap signal to the first output driver 80 through the non-inverse output node NQP and inverse output node NQN. For this operation, a first NMOS transistor MN71 regulates the amount of current flowing from the non-inverse output node NQP to a sink node SN71 in accordance with a potential of a non-inverse data signal on the non-inverse input line FDP.

In more detail, if the non-inverse data signal on the non-inverse input line FDP is set in a high potential, the NMOS transistor MN71 flows more current from the non-inverse output node NQP toward the first sink node SN71 so as to cause a low-potential data to signal appear at the non-inverse output node NQP. On the other hand, if the non-inverse data signal on the non-inverse input line FDP is set at a low potential, the NMOS transistor MN71 flows less current from the non-inverse output node NQP toward the first sink node SN71 so as to cause a high-potential data signal to appear at the non-inverse output node NQP.

In a first pre-driver 70, a NMOS transistor MN72, responding to an inverse data signal on the inverse input line FDN, also regulates the amount of current flowing from the inverse output node NQN toward the first sink node SN71, causing the inverse data signal to appear at the inverse output node NQN as a high or a low-potential data signal. Due to the second NMOS transistor MN72, the inverse data signal on the inverse output node NQN is conditioned into a low potential when the inverse data signal on the inverse input line FDN is set to a high potential, and conditioned to a high potential when the inverse data signal on the inverse input line FDN is set to a low potential data signal.

Figure 5A:
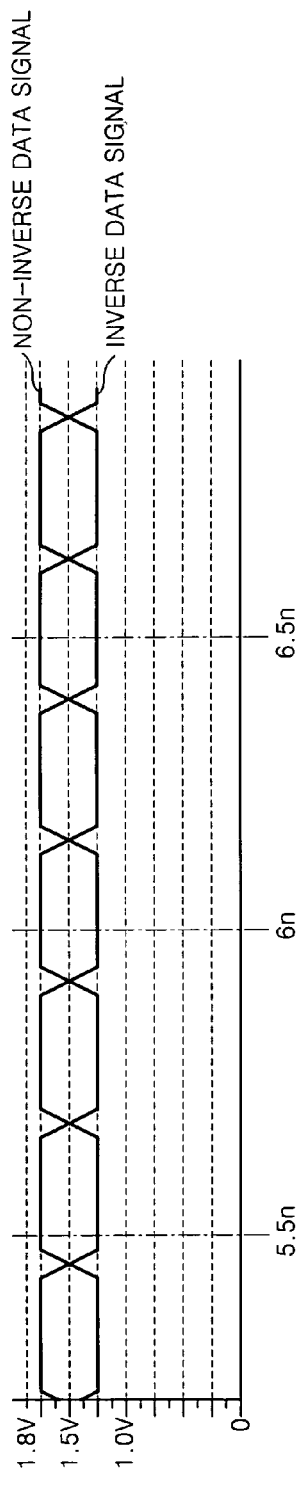
FIGS. 5A through 5C are waveform diagrams of signals generated by elements in the system of FIG. 4.
Figure 5B:
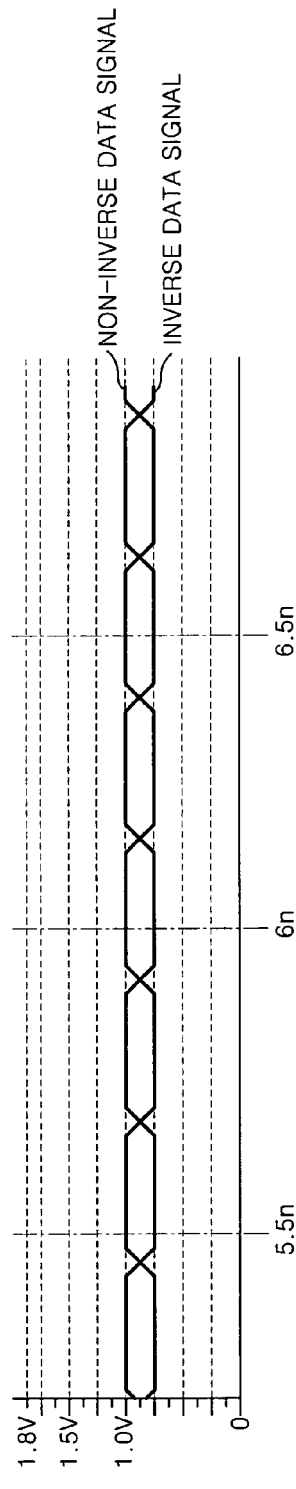
Figure 5C:
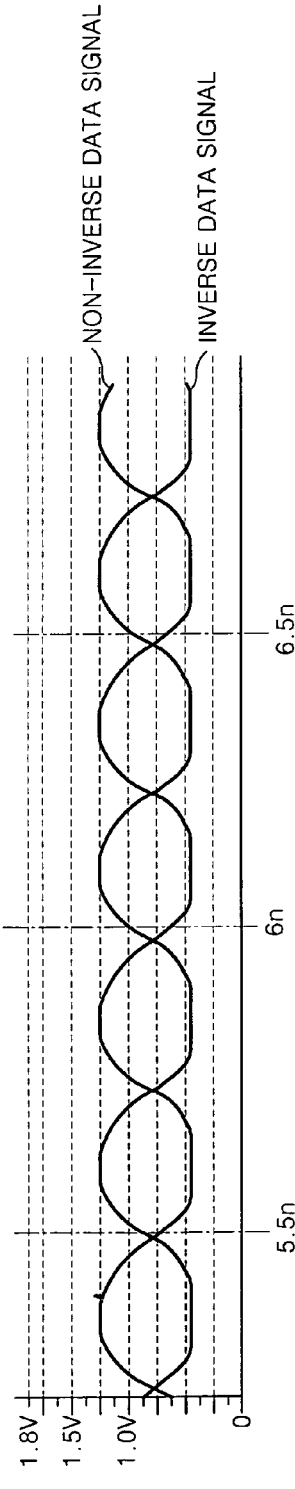

FIGS. 5A through 5C are waveform diagrams of signals generated by elements in the system of FIG. 4. Due to the current regulating operations of the first and second NMOS transistors MN 71 and MN 72, differential signals may be generated at the first non-inverse output node NQP and the first inverse output node NQN. These differential signals swing (or oscillate) at a reference voltage level that is different from that of the differential data signals on the non-inverse input line FDP and the inverse input line FDN. This feature is better illustrated in the waveforms of FIGS. 5A through 5C.

As shown in FIG. 5A, non-inverse and inverse data signals on the first non-inverse and inverse input lines FDP and FDN have waveforms oscillating at an amplitude of about 0.6V on the basis of a 1.5V signal. For example, the non-inverse and inverse data signals on the first non-inverse and inverse input lines FDP and FDN may oscillate in a range of voltage levels between about 1.2V and 1.75V.

Referring to FIG. 5B, as the differential data signals on the non-inverse and inverse input lines FDP and FDN are differentially amplified, resultant differential data signals appear at the first non-inverse and inverse output nodes NQP and NQN. The non-inverse and inverse data signals on the first non-inverse and inverse output nodes NQP and NQN may have waveforms oscillating at an amplitude of about 0.15V on the basis of a 0.85V signal. For example, the non-inverse and inverse data signals on the first non-inverse and inverse output nodes NQP and NQN may oscillate in a range of voltage levels between about 1.2V and 1.75V. As a result, the pre-driver 70 shifts the reference voltage levels of the differential data signals on the non-inverse and inverse input lines FDP and FDN, as well as providing current amplification for the differential data signals.

In addition, the pre-driver 70 includes a first resistor R71 connected between the non-inverse output node NQP and a high-potential power source VDD, a second resistor R72 connected between the inverse output node NQN and the high-potential power source VDD, and a third NMOS transistor MN73 connected between the first sink node SN71 and a low-potential power source VSS. The first resistor R71 and second resistor R72 may serve as loads for the first and second NMOS transistors MN71 and MN72. The third NMOS transistor MN73 may function as a current sink to regulate the amount of current flowing through the first sink node SN71.

In order to regulate the current level at the first sink node SN71, the third NMOS transistor MN73 regulates the amount of current flowing from the first current sink node SN71 toward the low-potential power source VSS based on a potential level of a bias voltage signal FBS. In an example, the bias voltage signal FBS may be set in advance by a manufacturer or a user. If the bias voltage signal FBS is set to a high potential level, the current level increases from the first sink node SN71 to the low-potential power source VSS. The increased current raises the differentially amplified difference between the non-inverse and inverse data signals on the first non-inverse and inverse output nodes NQP and NQN.

Otherwise, where the bias voltage signal FBS is set to a low potential level, the current level is reduced from the first sink node SN71 to the low-potential power source VSS. The decreased current reduces the differentially amplified difference between the non-inverse and inverse data signals on the non-inverse and inverse output nodes NQP and NQN. As a result, a potential level of the bias voltage signal FBS applied to the third NMOS transistor MN73 regulates a rate of differential amplification in the first pre-driver 70.

The first output driver 80 may include a fourth NMOS transistor MN81 connected between the non-inverse transmission line TLP and a second sink node SN81, a fifth NMOS transistor MN82 connected between the inverse transmission line TLN and the second sink node SN81, and a first current sink CRS81 connected between the second sink node SN81 and the low-potential power source VSS. The fourth and fifth NMOS transistors MN81 and MN82 amplify a difference between the differential data signals on the non-inverse and inverse output nodes NQP and NQN of the first pre-driver 70. The differentially amplified non-inverse and inverse data signals are transferred through the non-inverse and inverse transmission lines TLP and TLN.

For example, the fourth NMOS transistor MN81 regulates the amount of current flowing from the non-inverse transmission line TLP toward the second sink node SN81 based on a potential of the non-inverse data signal on the non-inverse output node NQP. In an example, when the non-inverse data signal on the non-inverse output node NQP is set to a high potential, the fourth NMOS transistor MN81 increases the amount of current flowing from the non-inverse transmission line TLP toward the second sink node SN81. This causes a low-potential data signal to appear on the non-inverse transmission line TLP. On the other hand, when the non-inverse data signal on the non-inverse output node NQP is set to a low potential, the fourth NMOS transistor MN81 decreases the amount of current flowing from the non-inverse transmission line TLP toward the second sink node SN81. This causes a high-potential data signal to appear on the non-inverse transmission line TLP.

In the first output driver 80, the fifth NMOS transistor MN82, somewhat similar to the fourth NMOS transistor MN81, regulates the amount of current flowing from the inverse transmission line TLN toward the second sink node SN81 in response to the inverse data signal on the inverse output node NQN. Accordingly, a low or high-potential inverse data signal may appear on the inverse transmission line TLN. Due to the operation of the fifth NMOS transistor MN82, the inverse data signal on the inverse transmission line TLN results in a low potential when the inverse data signal of the inverse output node NQN is conditioned to a high potential, and results in a high potential when the inverse data signal at the inverse output node NQN is conditioned to a low potential. The second current sink CRS81 maintains the amount of current so as to uniformly flow through the second sink node SN81.

In addition, the first output driver 80 may include a first PMOS transistor MP81 connected between a third sink node SN82 and the non-inverse transmission line TLP, a second PMOS transistor MP82 connected between the third sink node SN82 and the inverse transmission line TLN, and a second current sink CRS82 connected between the high-potential power source VDD and the third sink node SN82. The first and second PMOS transistors MP81 and MP82, somewhat similar to the fourth and fifth NMOS transistors MN81 and MN82, amplify a difference between the differential data signals on the first non-inverse and inverse output lines FQP and FQN of the first input driver 60. The differentially amplified non-inverse and inverse data signals are transferred through the non-inverse and inverse transmission lines TLP and TLN.

For example, the first PMOS transistor MP81 regulates the amount of current flowing from the third sink node SN82 toward the non-inverse transmission line TLP in response to a potential of the non-inverse data signal on the first non-inverse output line FQP. When the non-inverse data signal on the first non-inverse output line FQP is set to a high potential, the first PMOS transistor MP81 increases the amount of current flowing from the third sink node SN82 toward the non-inverse transmission line TLP. This causes a low-potential data signal to appear on the non-inverse transmission line TLP. On the other hand, when the non-inverse data signal on the first non-inverse output line FQP is set to a low potential, the first PMOS transistor MP81 decreases the amount of current flowing from the third sink node SN82 toward the non-inverse transmission line TLP. This causes a high-potential data signal to appear on the non-inverse transmission line TLP.

Similar to the first PMOS transistor MP81, the second PMOS transistor MP82 regulates the amount of current flowing from the third sink node SN82 toward the inverse transmission line TLN in response to the inverse data signal on the first inverse output line FQN. Accordingly, a low or high-potential inverse data signal may appear on the inverse transmission line TLN. Due to the operation of the second PMOS transistor MP82, the inverse data signal on the inverse transmission line TLN results in a low potential when the inverse data signal of the first inverse output line FQN is conditioned in a high potential, and results in a high potential when the inverse data signal of the first inverse output line FQN is conditioned to a low potential. The third current sink CRS82 maintains a uniform current flow through the third sink node SN82. The second sink node SN82 enables the amount of current at the third sink node SN82 to be increased so as to control a differential amplification rate via the first and second PMOS transistors MP81 and MP82.

The first input driver 60 differentially amplifies a difference between the non-inverse and inverse data signals detected by a terminal resistor R21 that is connected between the non-inverse and inverse transmission lines TLP and TLN. The differentially amplified non-inverse and inverse data signals thus appear respectively on the first non-inverse and inverse output lines FQP and FQN. For this operation, the first input driver 60 includes two circuits: a serial circuit having a third PMOS transistor MP61 and a sixth NMOS transistor MN61, and a serial circuit having a fourth PMOS transistor MP62 and a seventh NMOS transistor MN62. The serial circuits may be connected in parallel between fourth and fifth sink nodes SN61 and SN62.

The third and fourth PMOS transistors MP61 and MP62, somewhat similar to the first and second PMOS transistors MP81 and MP82, differentially amplify the differential data signals on the non-inverse and inverse transmission lines TLP and TLN. The sixth and seventh NMOS transistors MN61 and MN62, somewhat similar to the fourth and fifth NMOS transistors MN81 and MN82, differentially amplify the differential data signals on the non-inverse and inverse transmission lines TLP and TLN. The third PMOS transistor MP61 and the sixth NMOS transistor MN61 each amplify the non-inverse data signal in a push-pull mode, in response to the non-inverse data signal on the non-inverse transmission line TLP.

For example, a low-potential component of the non-inverse data signal on the non-inverse transmission line TLP is amplified by the third PMOS transistor MP61, while a high-potential component of the non-inverse data signal on the non-inverse transmission line TLP is amplified by the sixth PMOS transistor MN61. Similarly, the fourth PMOS transistor MP62 and the seventh NMOS transistor MN62 conduct a push-pull amplifying operation for each of the low and high-potential components of the inverse data signal corresponding thereto, in response to the inverse data signal of the inverse transmission line TLN. These differential and push-pull amplifications are performed at the same time, and the third PMOS transistor MP61 is conductive in a saturation region, rather than in an active region, and also in an alternate mode along with the sixth NMOS transistor MN61, in response to a potential level of the non-inverse data signal on the non-inverse transmission line TLP. Similarly, the fourth PMOS transistor MP62 is conductive in a saturation region and in an alternate mode along with the seventh NMOS transistor MN62, in response to a potential level of the inverse data signal on the inverse transmission line TLN.

As a result, non-inverse and inverse data signals with a large difference in amplitude are charged on the first non-inverse and inverse output lines FQP and FQN, respectively. The non-inverse and inverse data signals on the non-inverse and inverse output lines FQP and FQN have the opposite phases as compared to the data signals on the non-inverse and inverse transmission lines TLP and TLN, respectively, but have the same phase as corresponding non-inverse and inverse data signals on the non-inverse and inverse output nodes NQP and NQN of the first pre-amplifier 70.

The first input driver 60 includes a fourth current sink CRS61 connected between the high-potential power source VDD and the fourth sink node SN61, and a fifth current sink CRS62 connected between the fifth sink node SN62 and the low-potential power source VSS. As the fourth current sink CRS61 may be designed to regulate the current amount (i.e., increase or decrease the current at the fourth sink node SN61 by a manufacturer or by a user), so that the current is available to adjust a differential amplification rate through the third and fourth PMOS transistors MP61 and MP62. The fourth current sink CRS61 also regulates the current amount at a given level at the fourth sink node SN61.

Similar to the fourth current sink CRS61, the fifth current sink CRS62 regulates the current amount at the fifth sink node SN62, which may be done by a manufacturer or a user, so that the current is available to adjust a differential amplification rate through the sixth and seventh NMOS transistors MN61 and MN62. The fifth current sink CRS61 regulates the current amount at a given level at the fifth sink node SN62.

As the differential data signals returning to the first output driver 80 as feedback from the first non-inverse and inverse output lines FQP and FQN are conditioned to be in the same phase as the differential data signals at the non-inverse and inverse output nodes NQP and NQN, the first PMOS transistor MP81 prosecutes the push-pull amplification along with the fourth NMOS transistor MN81, and the second PMOS transistor MP82 prosecutes the push-pull amplification along with the fifth NMOS transistor MN82. In more detail, the first PMOS transistor MP81 amplifies a low-potential component of the non-inverse data signal on the first non-inverse output line FQP, while the fourth NMOS transistor MN81 amplifies a high-potential component of the non-inverse data signal on the first non-inverse output node NQP. Similarly, the second PMOS transistor MP82 amplifies a low-potential component of the inverse data signal on the first inverse output line FQN, while the fifth NMOS transistor MN82 amplifies a high-potential component of the inverse data signal on the first inverse output node NQN.

Due to the operations of the first and second PMOS transistors MP81 and MP82 and the third and fifth NMOS transistors MN81 and MN82, the differential data signals at the first non-inverse and inverse output nodes NQP and NQN of the first pre-driver 70 are amplified so as to be conductive with a large amount of current. This larger amount of current associated with the non-inverse and inverse data signals (appearing on the non-inverse and inverse transmission lines TLP and TLN), is detected as an amplitude varying in proportion to the current amount thereof.

Referring to FIG. 5C for example, the non-inverse and inverse data signals on the non-inverse and inverse transmission lines TLP and TLN have waveforms oscillating in a voltage width range of about 0.9V on the basis of a reference voltage level of 0.85V, similar to the case of the data signals on the first non-inverse and inverse output nodes NQP and NQN of the first pre-driver 70. In other words, the non-inverse and inverse data signals of the first non-inverse and inverse transmission lines TLP and TLN swing in a range of voltage levels of between 0.3V to about and 1.2V.

As a result, the non-inverse and inverse transmission lines TLP and TLN are respectively charged with the non-inverse and inverse data signals amplified from the differential data signals, which are loaded on the first non-inverse and inverse output nodes NQP and NQN by the first output driver 80 using a combination of differential and push-pull amplifications. The non-inverse and inverse data signals amplified by the first output driver 80 may have sufficiently large currents (i.e., a sufficient power level) to be transferred toward the second input driver 62 by way of the non-inverse and inverse transmission lines TLP and TLN. These current-amplified non-inverse and inverse data signals on the non-inverse and inverse output lines TLP and TLN swing (or oscillate) in voltage widths which are greater than the differential data signals on the first non-inverse and inverse output nodes NQP and NQN.

Accordingly, the differential data signals on the first non-inverse and inverse input lines FDP and FDN are at a sufficient power level (due to the operations in the first pre-driver 70 and the first output driver 80) so as to be transferred toward the second input driver 62 by way of the non-inverse and inverse transmission lines TLP and TLN. In addition, as the two PMOS transistors MP81 and MP82 and the two NMOS transistors MN81 and MN82 are configured so as to respond independently to their corresponding differential data signals in the same phase, it is possible to transfer the data signals to the transmission lines TLP and TLN at a high frequency. Moreover, since the first output driver 80 only requires a single pair (2) of differential data signals from the differential signal source including the first pre-driver 70, circuit architecture of the first pre-driver 70 and the differential data signal source may be amplified.

Figure 3:
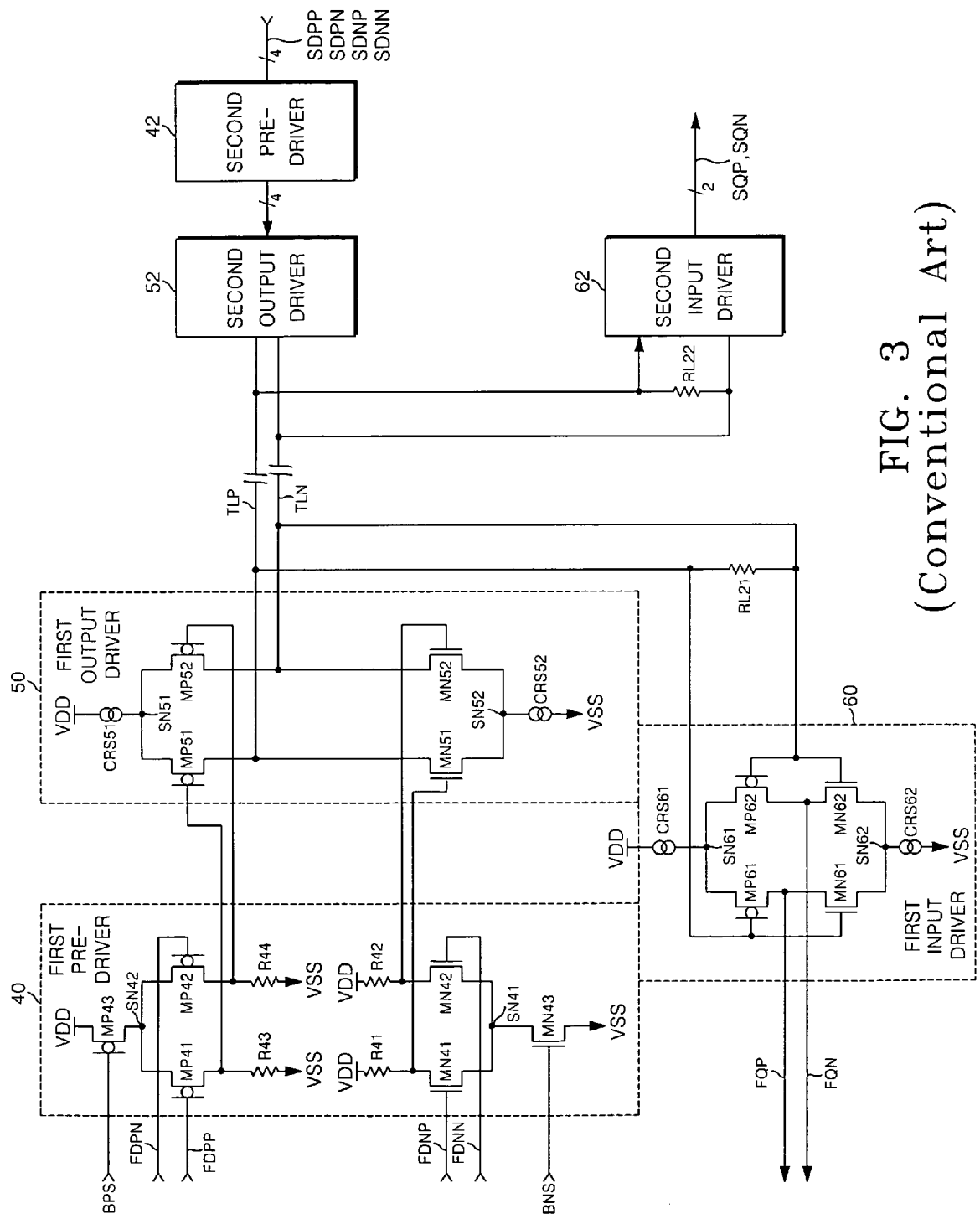
FIG. 3 is a circuit diagram of a conventional half-duplex communication system including a duplex LVDS transmitter.

In another example embodiment, the pre-driver 70 may be comprised of three PMOS transistors MP41 through MP43, as shown in the top side of the first pre-driver 40 of FIG. 3, instead of the NMOS transistors MN71 through MN73. In this case, the first pre-driver 70 with three PMOS transistors MP41~MP43 outputs differential data signals varying in the region of the high potential levels. Thus, the differential data signals amplified by the first pre-driver 70 each would be applied to gate terminals of the first and second PMOS transistors MP81 and MP82 of the first output driver 80. The differential data signals on the first non-inverse and inverse output lines FQP and FQN connected to the first input driver 60 would return to corresponding gate terminals of the fourth and fifth NMOS transistors MN81 an MN82 via a feedback loop therein.

Figure 1:
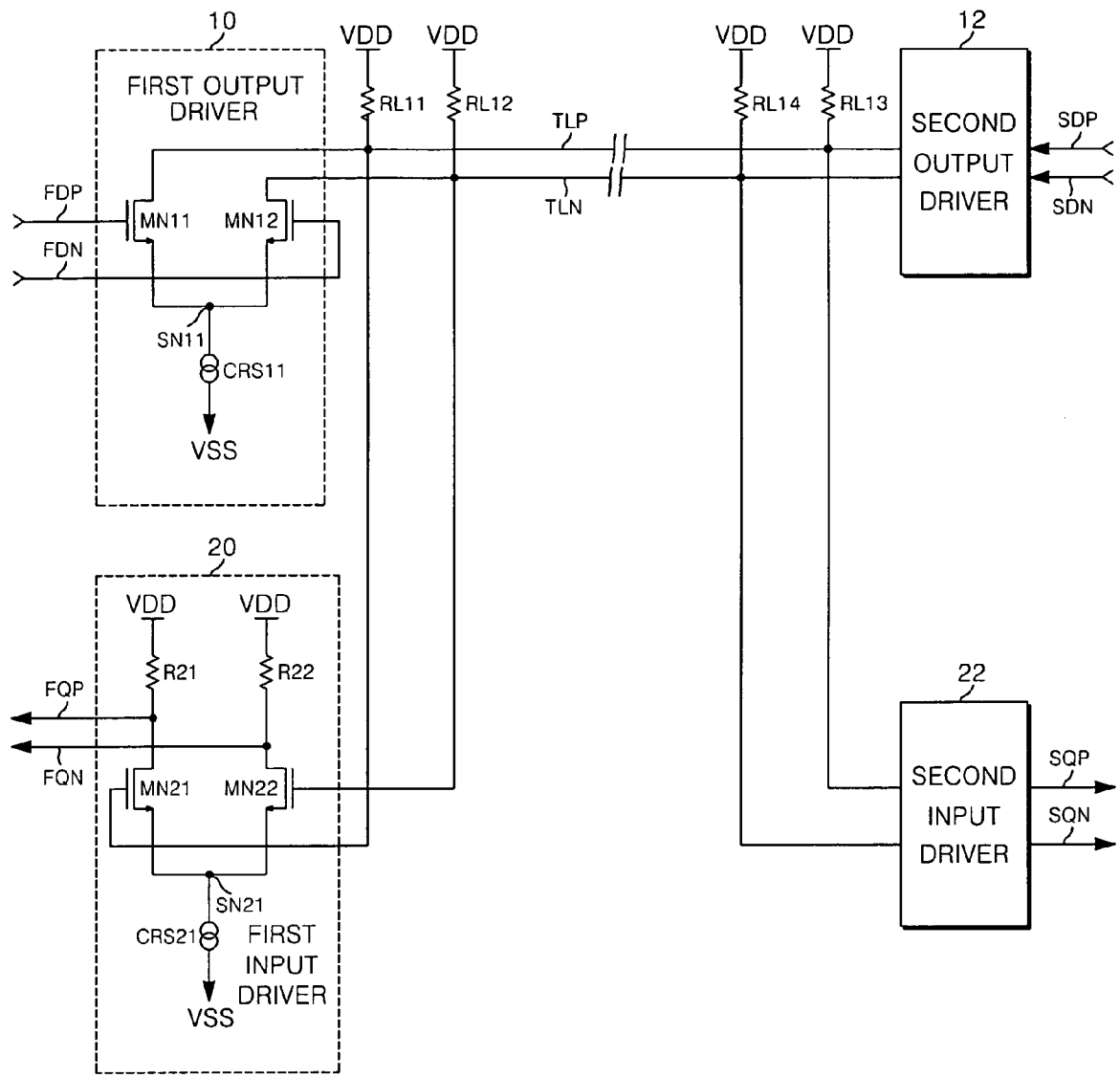
FIG. 1 is a circuit diagram of a conventional half-duplex communication system including a current-mode transmitter.
Figure 2:
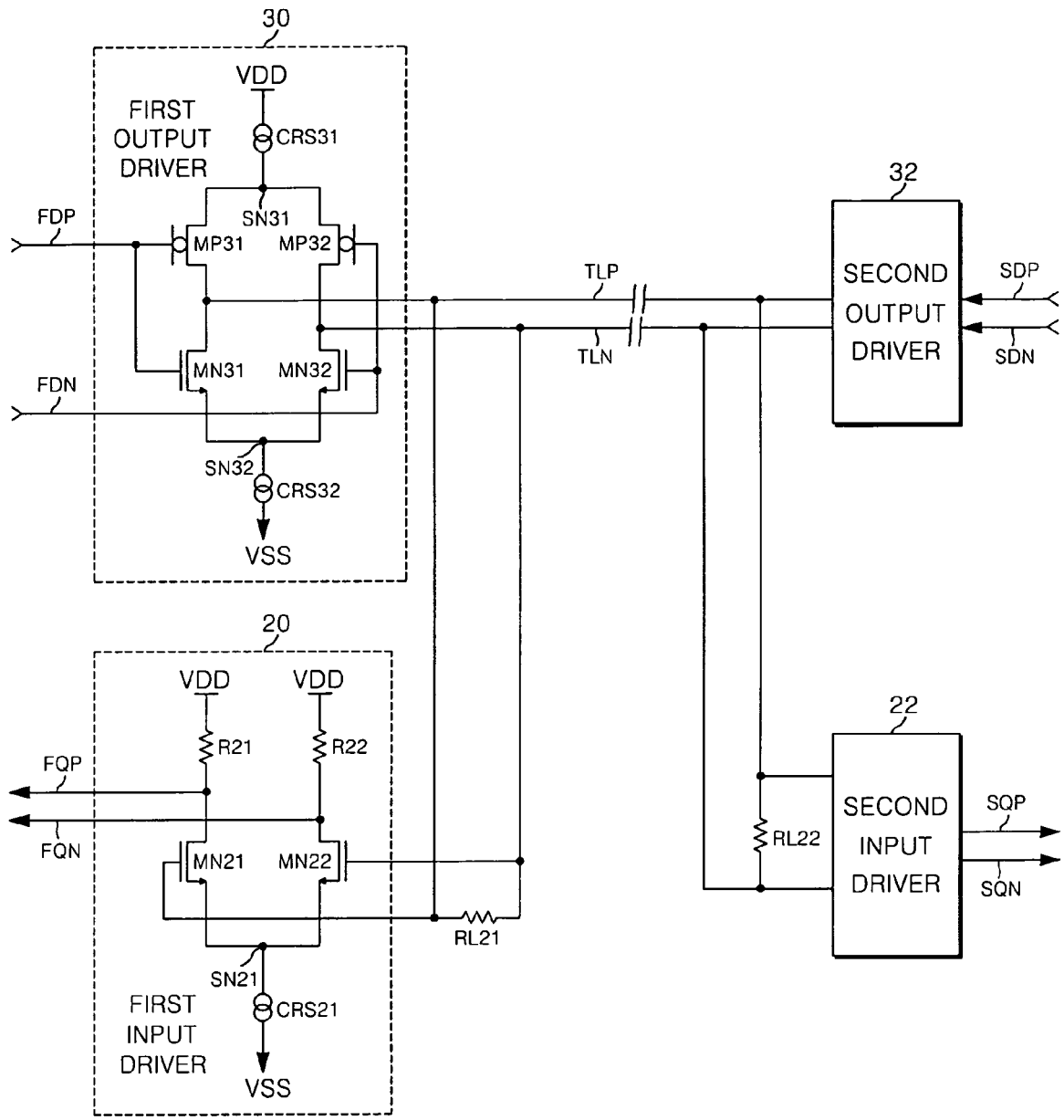
FIG. 2 is a circuit diagram of a conventional half-duplex communication system including a LVDS transmitter.

Also in this alternative example embodiment, the first input driver 60 may be configured as the input driver 20 of FIG. 1, which includes two NMOS transistors MN21 and MN22. This provides a differential amplifier operable in a current mode. As the differential data signals on the first non-inverse and inverse output lines FQP and FQN, amplified by the first input driver 20, would be variable in the low-potential level region, these signals may return to corresponding gate terminals of the fourth and fifth NMOS transistors MN81 and MN82.

In another example embodiment, the first input driver 60 may be implemented as a current-mode differential amplifier with only PMOS transistors MP61 and MP62. In this case, although the sixth and seventh NMOS transistors MN61 and MN62 are removed from the first input driver 60, resistors may be connected between the first non-inverse output line FQP and the low-potential power source VSS, and between the first inverse output line FQN and the low-potential power source VSS. As the differential data signals on the first non-inverse and inverse output lines FQP and FQN are variable in the high-potential level region, the differential data signal may be applied to corresponding gate terminals of the first and second PMOS transistors MP81 and MP82 of the first output driver 80 as shown in FIG. 4.

As stated above, according to the LVDS transceiver 400/450 and the half-duplex communication system including the same, since the first output driver 80 responds all to the returning and input differential data signals, it is possible to transfer data signals through the transmission lines in high frequency. Moreover, as the LVDS half-duplex transceiver 400/450 according to the invention uses only a single pair of differential signals from the differential signal source including the first pre-driver 60, it is able to simplify the circuit architecture of the differential data signal source as well as the first pre-driver 60.

Example embodiments of the present invention being thus described, it will be obvious that the same may be varied in many ways. Such variations are not to be regarded as departure from the spirit and scope of example embodiments of the present invention, and all such modifications as would be obvious to one skilled in the art are intended to be included within the scope of the following claims.

What is claimed is:

1. A low-voltage differential signaling transceiver, comprising:
    a plurality of input terminals receiving a plurality of differential data signals;
    an input driver transferring the differential data signals from one or more differential transmission lines through a plurality of output terminals; and
    an output driver transferring the differential data signals from the input terminals through the differential transmission lines in response to the differential data signals at the input terminals and at the output terminals of the input driver.

2. The transceiver of claim 1, wherein the output driver includes:
    a pair of first channel transistors regulating currents on the differential transmission lines in response to differential data signals received from a corresponding input terminals, and
    a pair of second channel transistors regulating the currents on the differential transmission lines in response to differential data signals returning thereto via a feedback loop.

3. The transceiver of claim 2, wherein
    the input driver includes a current-mode differential amplifier driven in a high potential region, and
    the pair of second channel transistors are PMOS transistors.

4. The transceiver of claim 2, wherein the input driver includes:
    a third pair of transistors driven in a high potential region in response to the differential data signals on the differential transmission so as to regulate the current on the differential transmission line, and
    a fourth pair of transistors driven in a low potential region in response to the differential data signals on the differential transmission so as to regulate the current on the differential transmission lines, and
    wherein the pair of second channel transistors are PMOS transistors.

5. The transceiver of claim 2, wherein
    the input driver includes a current-mode differential amplifier driven in a low potential region, and
    the pair of second channel transistors are NMOS transistors.

6. The transceiver of claim 1, further comprising:
    a pre-driver shifting a reference voltage level of the differential data signals to be supplied to the output driver from the input terminals, wherein the pre-driver is connected between the input terminals and the output driver.

7. The transceiver of claim 6, wherein the output driver includes:
    a pair of first channel transistors regulating currents on the differential transmission lines in response to corresponding differential data signals received from the pre-driver, and
    a pair of second channel transistors regulating the currents on the differential transmission lines in response to differential data signals returning thereto via a feedback loop.

8. The low-voltage differential signaling transceiver as set forth in claim 7, wherein
    the pre-driver includes a current-mode differential amplifier driven in a low potential region, and
    the pair of first channel transistors are NMOS transistors.

9. The transceiver of claim 7, wherein
    the pre-driver includes a current-mode differential amplifier driven in a high potential region, and
    the pair of first channel transistors are PMOS transistors.

10. The transceiver of claim 2, wherein the feedback loop is configured to return the differential data signals of the differential transmission lines toward the output driver, the returning differential data signals having the same phases as the differential data signals at the input terminals.

11. A half-duplex communication system, comprising:
    a first transceiver, and
    a second transceiver connected to the first transceiver via a non-inverse transmission line and an inverse transmission line, wherein each transceiver includes:
        a plurality of input terminals receiving a plurality of differential data signals,
        an input driver transferring the differential data signals from differential transmission lines through output terminals,
        an output driver transferring the differential data signals from the input terminals through the differential transmission lines and out to one of the first and second transceivers via the non-inverse and inverse transmission lines, in response to the differential data signals at the input terminals and at the output terminals of the input driver, and
        a pre-driver configured to shift a reference voltage level of differential data signals input thereto from the input terminals and to be supplied to the output driver therefrom.

* * * * *